March 31, 1970  A. DUNLOP  3,503,435
APPARATUS FOR USE IN THE MANUFACTURE OF SHELL MOULDS
Filed June 11, 1968  2 Sheets-Sheet 1

INVENTOR
ADAM DUNLOP
BY
Crowley, Kiely & Stevens
ATTORNEYS

United States Patent Office 3,503,435
Patented Mar. 31, 1970

3,503,435
APPARATUS FOR USE IN THE MANUFACTURE
OF SHELL MOULDS
Adam Dunlop, 23 Manse View Terrace, Douglas,
Lanark, Scotland
Filed June 11, 1968, Ser. No. 736,108
Claims priority, application Great Britain, June 15, 1967,
27,687/67
Int. Cl. B22c *13/08;* B29c *13/00*
U.S. Cl. 164—166                                       6 Claims

ABSTRACT OF THE DISCLOSURE

Shell moulds are prepared by supporting at least one pattern from a carrier rotatable around a horizontal axis so that the patterns will project transversely from one side of the axis of rotation of the carrier, and means for raising and lowering the carrier is provided so that the pattern can be immersed in a first container of mould-forming material, raised and moved to a position over a second container, immersed in the second container of mould-forming material and so on to build up the desired number of layers of refractory material. A minimum of space is used with this apparatus.

---

This invention relates to apparatus for use in the manufacture of shell moulds which are formed of layers of refractory material built up on a pattern. The shell moulds thus formed are subsequently used in casting operations and the patterns (which are removed before casting takes place) may be formed of wax or synthetic resin material or any other expendable material which can be removed by being melted out or in any other convenient way. Alternatively the pattern may be formed of wood or metal and withdrawn from the mould when the latter is completed.

One form of such apparatus is described in my prior Patent No. 906,380 which relates to apparatus comprising a carrier rotatable about a horizontal or substantially horizontal axis, pattern supporting means connected or adapted to be connected to said carrier so that in use a pattern or patterns will project transversely from one side of the axis or rotation of the carrier and will rotate about said axis as the carrier rotates, and a pair of containers for mould-forming material which are so disposed in relation to the carrier that the pattern or patterns can be entered into one or other of the containers by rotating said carrier about said horizontal axis, the arrangement being such that mould-forming material is applied to the pattern or patterns by rotating the carrier so as to cause the pattern or patterns to be brought successively into engagement with material in the two containers.

The object of the present invention is to provide a modified form of the apparatus described in the preceding paragraph.

In the modification according to the invention, at least two spaced containers are provided for mould-forming material and means are provided for relatively displacing said containers and the carrier in a vertical or generally vertical direction and for moving the carrier between the containers.

With the above-described arrangement, when a pattern mounted on the carrier is to be disengaged from one container, the container is moved downwardly or the carrier is moved upwardly before the pattern is moved towards the next container or is removed from the carrier so that there is time for any surplus (such as slurry) to drain off the pattern.

Figure 1:
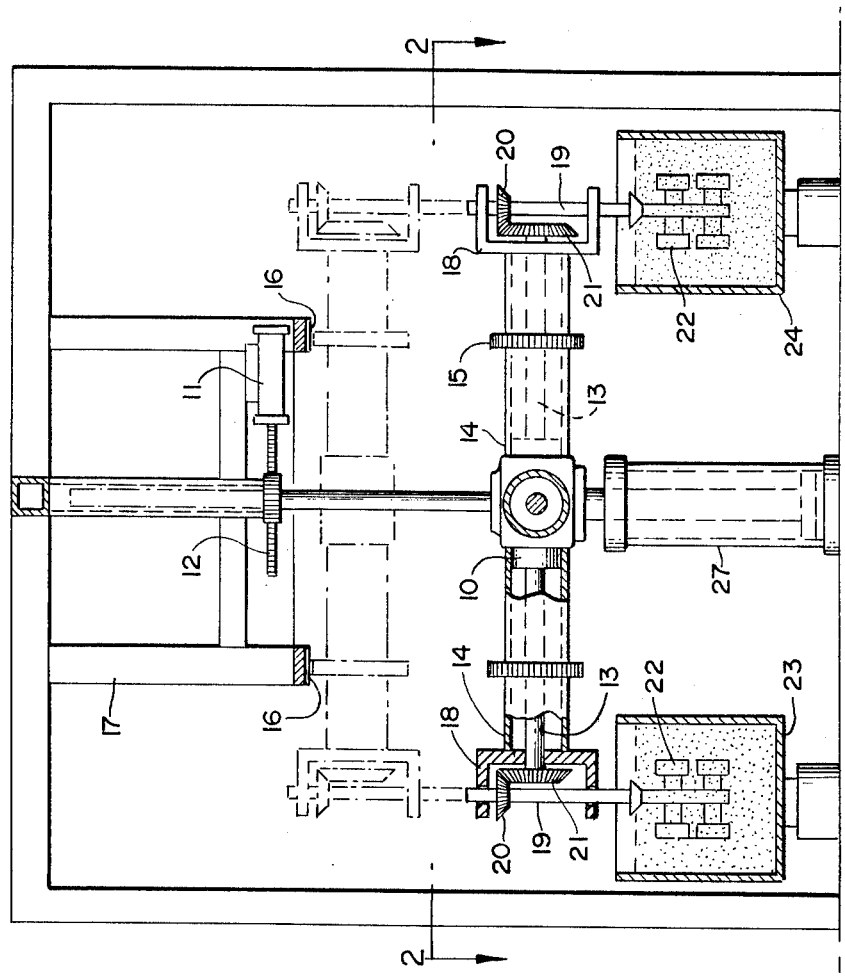
Figure 2:
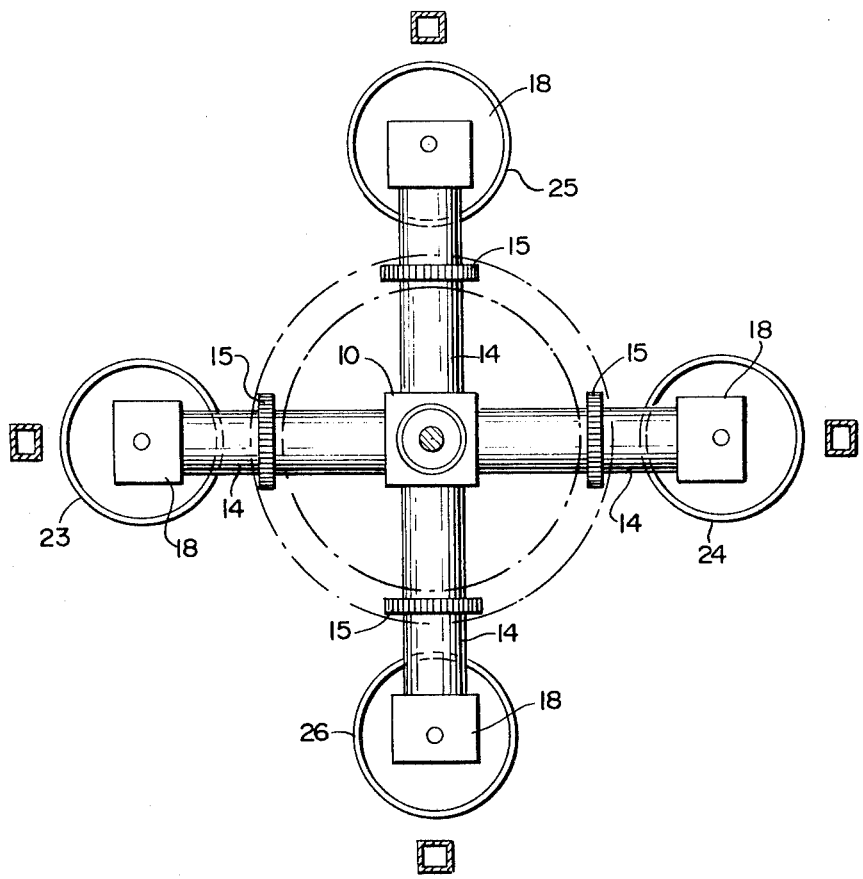

The invention will now be more particularly described with reference to the accompanying drawings wherein:

FIGURE 1 is an elevation showing one example of an apparatus in accordance with the invention, and
FIGURE 2 is a plan view taken on the line 2—2 of FIGURE 1.

Referring to the example shown in the drawings, there is provided a central support in the form of a spider 10 which is adapted to be rotated about a vertical or substantially vertical axis by any convenient means such as an air actuated cylinder 11 acting on a rack and pinion 12 through a ratchet mechanism. Projecting outwardly from the spider are four arms 13 which are spaced 90° apart and which are each secured against rotation about their own axes.

Mounted on each arm is a sleeve 14 which is rotatable on the arm, said sleeve carrying a toothed wheel 15 which is engageable with a fixed circular rack 16 secured to the underside of an upper support 17. Thus when the spider 10, together with the four arms 13, is rotated, each of said sleeves will be rotated about its own axis so long as the aforementioned toothed wheels 15 are in engagement with the circular rack 16.

At the outer end of each sleeve 14 there is provided a bracket 18 which rotates with the sleeve, and said bracket serves to support a carrier in the form of a spindle 19 which is supported in bearings in the bracket so as to extend in a direction at right angles to the length of the associated sleeve. On each spindle is mounted a bevel gear 20 which engages with another bevel gear 21 secured against rotation to the outer end of the adjacent arm 13 of the spider so that as the sleeve 14 together with the brarket 18 and spindle 19 rotate about the axis of the sleeve, the inter-engagement of said bevel gears will also result in rotation of the spindle about its own axis. Said spindle or carrier 19 is adapted to carry a pattern 22 on which a shell mould is to be formed.

The apparatus also includes at least two, and in the example now described four containers, namely two containers 23 and 24 which will be used for refractory material in the form of a fluidised bed, whilst the other two containers 25 and 26 will be used for slurry, one preferably containing an acid slurry whilst the other contains an alkaline slurry. Conveniently both of said slurry tanks 25 and 26 are mounted on a platform which is rotatable by an electric motor in order to keep the slurry in suspension. Said four containers are spaced at 90° intervals around the central vertical axis of the apparatus, and in forming a shell mould a pattern 22 will be passed successively from container to container round the apparatus, and may if desired, make more than one circuit of the four containers.

The aforementioned spider 10 and associated arms and carriers are also connected to a further air actuated cylinder 27 arranged with its axis extending in a vertical direction so that the whole spider assembly can be lifted and lowered in a vertical direction relative to the aforesaid containers. The upper position of the spider assembly is indicated by chain-dotted lines in FIGURE 1. Thus if one considers one of said carriers 19 on which a pattern is mounted, the pattern would be assembled to the carrier before the spider assembly is lowered by air cylinder 27 to bring the pattern into one of the slurry tanks, the pattern then depending below the associated carrier and extending in a generally vertical direction. After the pattern has thus been dipped in the slurry, the air cylinder 27 is operated again to raise the spider 10 and bring the aforesaid toothed wheels 15 into engagement with the circular rack 16, whereafter the first mentioned air cylinder 11 is actuated to turn the spider through 90°. The interval between the removal of the pattern from the slurry tank and actuation of said first mentioned air cylinder, as above mentioned, enables any surplus slurry to drain off the pattern and the turn through 90° will have the effect of rotating the sleeve 14 carrying the carrier and pattern, and also, by interaction of the bevel gears 20 and 21, of rotating the carrier and pattern about its own axis. The gearing between the toothed wheels 15 and the circular rack 16 is arranged so that at the end of the 90° turn, the pattern will again be extending downwardly in a vertical direction, so that lowering of the spider 10 by means of the second air cylinder 27 will have the effect of plunging the pattern into one of the containers 23 and 24 containing a fluidised bed of refractory material. The spider is again lifted to engage the toothed wheels with the circular rack again, and a further 90° movement effected before the spider is again lowered to bring the pattern into the next container, and so on until a sufficient thickness of refractory material has been built up on the pattern. The pattern can then be removed from the carrier at any suitable position.

In the above described arrangement, the aforementioned containers 23, 24, 25 and 26 are stationary in a vertical sense, whilst the spider 10 and associated arms and carriers are moved vertically relative to the containers. If desired, however, the containers themselves may be mounted on a support which is movable in a vertical direction so that in this case the spider assembly would remain fixed in a vertical direction.

In another version of the machine one slurry tank and one fluidised bed are used with provision for chemical hardening of the coat. This can be done by having an acid type slurry followed by a refractory fluidised bed, followed by a container which has an atmosphere of alkaline gas. Alternatively, when an alkaline slurry is used, this is followed by a fluidised bed and a container having an atmosphere of acidic gas.

In another version, when an acid slurry is used this is followed by a refractory fluidised bed which incorporates an alkaline salt. When an alkaline slurry is used the refractory fluidised bed will contain an acid salt.

Furthermore, instead of mounting said circular rack 16 on a fixed support 17 as above-described, the rack may be arranged so that it permanently engaged with the pinions or toothed wheels 15 and is, therefore, vertically movable with the spider assembly. In this case, however, the spider assembly is arranged to be rotatable relative to the circular rack and the latter is held against rotation so that as the spider assembly is rotated about its vertical axis the sleeves 14 will at the same time be rotated about their own axes.

What I claim is:

1. Apparatus for use in making shell moulds comprising a carrier rotatable about a horizontal or substantially horizontal axis, pattern supporting means connected or adapted to be connected to said carrier so that in use a pattern or patterns will project transversely from one side of the axis of rotation of the carrier and will rotate about said axis as the carrier rotates wherein there are provided at least two spaced containers for mould-forming material and means for relatively displacing said containers and the carrier in a vertical or generally vertical direction and for moving the carrier between the containers; a stationary circular rack which is engageable with a pinion secured to the carrier as the latter is rotated about said vertical or generally vertical axis for rotating the carrier about said horizontal or substantially horizontal axis from a vertical downward position to a vertical downward position during said rotation about the vertical axis.

2. Apparatus as claimed in claim 1 wherein the containers are secured against translatory movement in a horizontal plane and the carrier is rotatable about a vertical or generally vertical axis for moving the carrier between the containers.

3. Apparatus as claimed in claim 2 wherein at least one container is mounted for rotation about a vertical or generally vertical axis, said axis being the axis of the container.

4. Apparatus as claimed in claim 1 wherein the carrier is displaceable in a vertical or generally vertical direction by means of a fluid-pressure actuated piston and cylinder unit.

5. Apparatus as claimed in claim 2 wherein the carrier is rotatable about a vertical or generally vertical axis by means of a further fluid-pressure actuated piston and cylinder unit.

6. Apparatus as claimed in claim 1 wherein the carrier is provided with a pattern-carrying spindle which extends in a direction perpendicular to the horizontal axis of rotation of the carrier and which is arranged to rotate about its own axis as the carrier rotates about said horizontal axis.

References Cited

UNITED STATES PATENTS

| | | | |
|---|---|---|---|
| 1,014,282 | 1/1912 | Beausejour et al. | 118—425 |
| 2,041,788 | 5/1936 | Sprunger | 18—24 |
| 2,688,157 | 9/1954 | Schroeder | 18—24 |
| 3,110,627 | 11/1963 | Weiskopf et al. | 118—426 X |

J. HOWARD FLINT, JR., Primary Examiner

R. S. ANNEAR, Assistant Examiner

U.S. Cl. X.R.

18—24; 118—425, 426; 164—26